United States Patent
Gubesch et al.

(12) 
(10) Patent No.: US 6,679,562 B2
(45) Date of Patent: Jan. 20, 2004

(54) BICYCLE WHEEL

(75) Inventors: Werner Gubesch, Langenzenn (DE); Walter Goldbecker, Gütersloh (DE)

(73) Assignees: Gubesch GmbH, Wilhelmsdorf (DE); Schurmann Fahrradteile GmbH & CO. KG, Leopoldshoher Greste (DE)

( * ) Notice: Subject to any disclaimer, the term of this patent is extended or adjusted under 35 U.S.C. 154(b) by 0 days.

(21) Appl. No.: 10/169,391

(22) PCT Filed: Dec. 1, 2000

(86) PCT No.: PCT/DE00/04309
§ 371 (c)(1),
(2), (4) Date: Jun. 28, 2002

(87) PCT Pub. No.: WO01/49512
PCT Pub. Date: Jul. 12, 2001

(65) Prior Publication Data
US 2003/0001429 A1 Jan. 2, 2003

(30) Foreign Application Priority Data
Jan. 7, 2000 (DE) .......................................... 100 00 399

(51) Int. Cl.$^7$ ................................................. B60B 1/14
(52) U.S. Cl. ........................... 301/64.704; 301/64.701; 301/64.101
(58) Field of Search ....................... 301/64.101, 64.102, 301/64.701, 64.702, 64.703, 64.704, 64.705, 67, 95.101, 95.102, 95.103, 95.104, 104

(56) References Cited

U.S. PATENT DOCUMENTS

| 3,250,571 A | * | 5/1966 | Richter |
| 4,487,456 A | * | 12/1984 | Zulauf .................. 301/63.101 |
| 4,919,490 A | * | 4/1990 | Hopkins et al. ....... 301/64.705 |
| 5,707,114 A | | 1/1998 | Schlanger |

FOREIGN PATENT DOCUMENTS

| DE | 38 33 749 | 7/1989 |
| DE | 44 44 044 | 7/1996 |
| DE | 200 09 038 | 10/2000 |
| DE | 199 21 578 | 2/2001 |
| FR | 2 761 300 | 10/1998 |
| WO | WO 95/04666 | 2/1995 |
| WO | WO 96/1119 | 4/1996 |

* cited by examiner

Primary Examiner—Russell D. Stormer
(74) Attorney, Agent, or Firm—Bachman & LaPointe, P.C.

(57) ABSTRACT

Described is a bicycle wheel (10) wherein the metal rim (12) is formed by a hollow-chambered rim (22) with an external flange (28) and an internal flange (26), by which a peripherally extending hollow rim chamber (35) is defined. The external flange (28) is provided with holes (34). The distal ends (38) of the spokes are integrally connected through the holes (34) in the external flange (28) to a spoke anchoring body (45) which extends peripherally in the hollow rim chamber (35) and which comprises the injection molding material of the spoke body (16).

3 Claims, 2 Drawing Sheets

BICYCLE WHEEL

BACKGROUND OF THE INVENTION

The invention concerns a bicycle wheel having a metal rim and a hub which are connected together by means of a plastic spoke body, wherein the spoke body is an injection molded spoke body having a central portion which is connected to the hub and spokes which project in one piece radially from the central portion and whose distal ends are connected to the metal rim which has a hollow-chambered rim with an external flange and an internal flange, wherein a peripherally extending hollow rim chamber is determined by the external and internal flanges.

DE 199 21 578 A1 discloses a bicycle wheel in which the distal ends of the spokes are connected to the metal rim by means of anchoring elements. The anchoring elements extend through holes in the metal rim. The operation of mounting the anchoring elements to the metal rim requires a given amount of expenditure and complication in terms of manipulation and production.

A bicycle wheel of the kind set forth in the opening part of this specification is known from WO 95/04666 A1. There, the distal ends of the spokes are formed in one piece with the hollow-chambered rim. The hollow-chambered rim extends around the wheel. A metal rim is fixed to the hollow-chambered rim. The metal rim is in the form of a rim which is simply profiled in a U-shape. Suitable fixing means are provided there for fixing the metal rim which is of a U-shape profile to the hollow-chambered rim which is in one piece with the distal ends of the spokes. The fixing means are for example ribs and grooves or the like which are adapted in shape thereto.

DE 38 33 749 A1 discloses a pneumatic-tire vehicle wheel having a rim produced from sheet metal and with radially extending rim flanges and bead seat surfaces arranged therebeside at the periphery for the bases of a tubeless tire, and a cast wheel dish which is connected to the rim in the region of the rim well. The well of the rim is enclosed, with a rim in one or two parts, in the form of a drop-base or flat-base or raised-base rim, by an axially extending prolongation portion of the wheel dish.

DE 44 44 044 A1 discloses a rim wheel for bicycles or the like, in particular with a hollow-chambered rim with braking surfaces for a rim brake, the braking surfaces being formed by the oppositely disposed annular sides of the rim. In the case of that known rim wheel the rim profile is provided with slots or holes which are open towards the braking surfaces and which are arranged distributedly over the annular sides of the rim. In its region which is displaced towards the hub of the wheel with respect to the profile openings, the rim can be provided with through openings which are in indirect or direct communication with the profile openings, by way of the internal space of the profile, for a through-flow of air. The through openings are desirably provided at the annular inward side of the rim in order to be able to fix wheel spokes.

U.S. Pat. No. 5,707,114 discloses a bicycle wheel which can have a hollow-chambered rim connected to spokes by means of anchoring elements. Assembly of the hollow-chambered rim to the spokes there represents an amount of work which cannot be disregarded.

The object of the present invention is so to develop the bicycle wheel of the kind set forth in the opening part of this specification that the connection of the spoke body, that is to say the distal ends of the spokes, to the metal rim, does not require any specific assembly or production expenditure, while the requirement of material for that connection is relatively slight.

SUMMARY OF THE INVENTION

In the bicycle wheel of the kind set forth in the opening part of this specification, that object is attained in accordance with the invention in that the metal rim has a central flange which transversely subdivides the hollow rim chamber and which establishes a peripherally extending anchoring chamber adjoining the external flange, and that the external flange is provided with holes, wherein the distal ends of the spokes are integrally connected through the holes in the external flange to a peripherally extending spoke anchoring body comprising the material of the spoke body, wherein the spoke anchoring body completely fills the anchoring chamber delimited by the central flange.

The bicycle wheel according to the invention has the advantage that, in the operation of injection molding the spoke body, the injection molding material penetrates through the holes in the external flange of the hollow-chambered rim into the anchoring chamber which is provided in the hollow rim chamber and which is delimited by the central flange, and there forms a spoke anchoring body. Independent anchoring elements for fixedly connecting the distal ends of the spokes to the metal rim are therefore advantageously dispensable.

As the peripherally extending anchoring chamber which is delimited by the central flange can be relatively small in relationship to the remaining hollow rim chamber, that affords the advantage in accordance with the invention that the total weight of the bicycle wheel is only imperceptibly increased by the spoke anchoring body.

In the case of a bicycle wheel with a hollow-chambered rim with a central flange, it is also possible for the distal ends of the spokes of the injection molded spoke body to be connected to the metal rim by means of anchoring elements such as screw pins or the like because then both the external flange and also the central flange are available for fixing purposes, that is to say for screwing through the anchoring elements.

In the bicycle wheel according to the invention the distal ends of the spokes can be provided separately from each other and the external flange of the hollow-chambered rim can be provided with a number of holes, which corresponds to the number of spokes. Such a configuration of the bicycle wheel according to the invention has a relatively small number of spokes, for example three, four, five or six spokes. In accordance with the invention, another possibility provides that the distal ends of the spokes are integrally connected to a rim ring which is provided at the outside of the metal rim and which comprises the material of the spoke body. With such a design configuration of the last-mentioned kind, the number of holes in the external flange of the hollow-chambered rim is so-to-speak independent of the number of spokes because the rim ring extends around the external flange of the hollow-chambered rim. With such a configuration of the last-mentioned kind however it is preferable if the external flange of the hollow-chambered rim is provided with a number of holes, which corresponds to the number of spokes, in order to achieve optimum mechanical properties. In the case of a bicycle wheel of the last-mentioned kind the number of spokes can be relatively great. The same applies for the number of holes in the external flange of the hollow-chambered rim.

BRIEF DESCRIPTION OF THE DRAWING

A portion shown on an enlarged scale of a bicycle wheel according to the invention, that is to say the hollow-chambered rim and the distal end, connected thereto, of a spoke of the injection molded spoke body of the bicycle wheel is described hereinafter and illustrated in the drawing.

DETAILED DESCRIPTION

Figure 1:
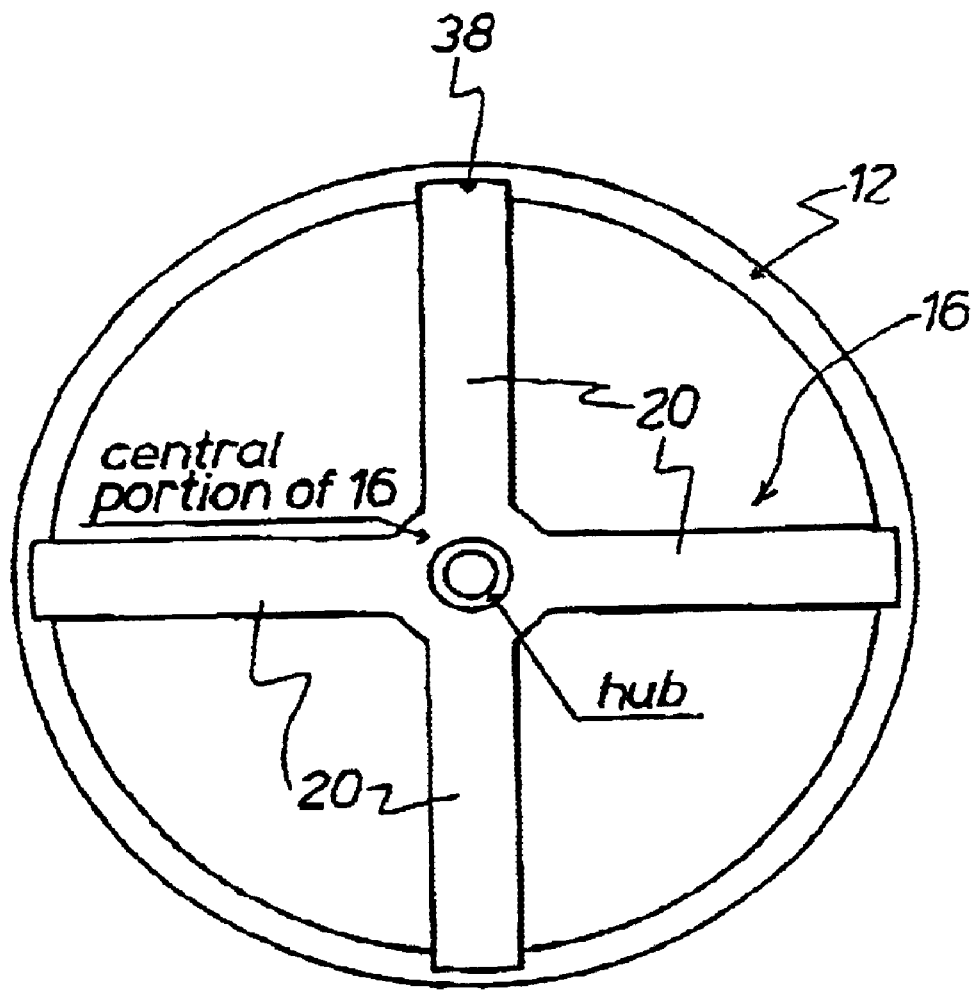
FIG. 1 is a side view of a bicycle wheel.
Figure 2:
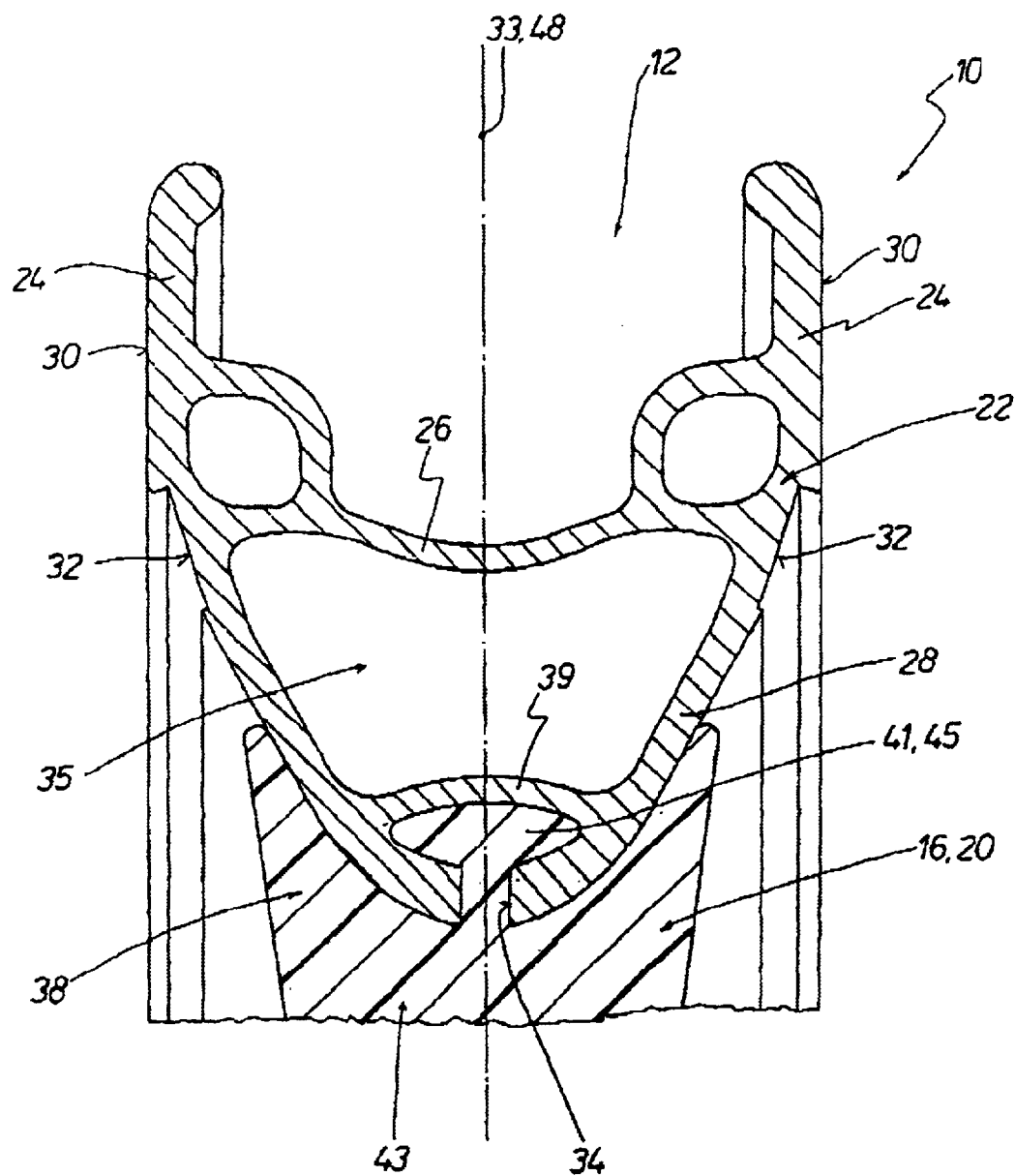
FIG. 2 is a sectional view of a bicycle wheel of FIG. 1.

FIG. 2 shows a sectional view of a bicycle wheel 10 of FIG. 1 or the metal rim 12 of the bicycle wheel 10 and, in respect of a portion thereof, the plastic spoke body 16 which is produced by injection molding. The plastic spoke body 16 has a number of spokes 20 which are positioned at uniform spacings in the peripheral direction of the metal rim 12 and radiate from the hub.

The metal rim 12 is in the form of a hollow-chambered rim 22, it has side cheek portions 24 as well as an internal flange 26 and an external flange 28.

The side cheek portions 24 of the hollow-chambered rim 22 are provided with external surfaces 30 which face away from each other and which serve as braking surfaces. Adjoining the external surfaces 30, at the inside as viewed in the radial direction, are peripherally extending recesses 32 in which reflective elements in the form of a circular ring (not shown) can be fixed.

The external flange 28 is provided with holes 34 which are equidistantly spaced from each other in the peripheral direction of the hollow-chambered rim 22, along the central plane 48 of the hollow-chambered rim 22, which extends through the dash-dotted line of symmetry 33 and is perpendicular to the plane of the drawing.

A hollow rim chamber 35 is defined by the internal flange 26 and the external flange 28.

Each spoke 20 has a distal end 38 associated with the hollow-chambered rim 22.

In the hollow rim chamber 35 the hollow-chambered rim 22 has a central flange 39 which, extending around the hollow-chambered rim 22, subdivides the hollow rim chamber 35 symmetrically with respect to the line of symmetry 33. The central flange 39 establishes a peripherally extending anchoring chamber 41 which is connected to the exterior of the hollow-chambered rim 22 through the holes 34 in the external flange 28.

In production of the bicycle wheel 10 the hollow-chambered flange 22 is introduced into a suitable injection molding tool. The plastic spoke body 16 is then produced in the injection molding tool, in which case the injection molding material penetrates through the holes 34 in the external flange 28 into the anchoring chamber 41 of the hollow-chambered rim 22 and completely fills the peripherally extending anchoring chamber 41 so that the distal ends 38 of the spokes 20 of the spoke body 16 are fixedly connected to the hollow-chambered rim 22. The injection molding material forms in the anchoring chamber 41 a spoke anchoring body 45 which is integrally connected to the spoke body 16 of the bicycle wheel 10 through the holes 34 in the external flange 28 of the hollow-chambered rim 22.

The distal ends 38 of the spokes 20 can be provided separately from each other outside the hollow-chambered rim 22, while another option provides that the distal ends 38 of the spokes 20 are integrally connected to a rim ring 43 comprising the material of the spoke body 16; the rim ring 43 extends peripherally around the hollow-chambered rim 22 or the external flange 28 thereof, on the outward side.

What is claimed is:

1. A bicycle wheel having a metal rim and a hub which are connected together by means of a spoke body, wherein the spoke body has a central portion which is connected to the hub and spokes which project in one piece radially from the central portion and whose distal ends are connected to the metal rim which has a hollow-chambered rim with an external flange and an internal flange, wherein a peripherally extending hollow rim chamber is defined by the external and internal flanges, and wherein the metal rim has a central flange which transversely subdivides the hollow rim chamber and which establishes anchoring chamber adjoining the external flange, wherein the distal ends of the spokes are respectively fixed to a spoke anchoring body comprising the material of the spokes in the anchoring chamber, characterized in that the spoke body is a plastic injection molding spoke body, wherein the spokes are integrally connected in respect of their material to the central portion, that the external flange is provided with holes which are spaced from each other in the peripheral direction, and that the distal ends of the spokes are connected integrally in respect of their material through the holes in the external flange to a peripherally extending spoke anchoring body comprising the material of the spoke body, wherein the spoke anchoring body completely fills the anchoring chamber delimited by the external flange and the central flange.

2. A bicycle wheel as set forth in claim 1, characterized in that the external flange of the hollow-chambered rim is provided with a number of holes, which corresponds to the number of spokes.

3. A bicycle wheel as set forth in claim 1, characterized in that the distal ends of the spokes are integrally connected to a rim ring comprising the material of the spoke body.

\* \* \* \* \*